United States Patent
Jackson et al.

(10) Patent No.: US 11,608,749 B2
(45) Date of Patent: Mar. 21, 2023

(54) AIRFOIL HAVING ENVIRONMENTAL BARRIER TOPCOATS THAT VARY IN COMPOSITION BY LOCATION

(71) Applicant: United Technologies Corporation, Farmington, CT (US)

(72) Inventors: Richard Wesley Jackson, Mystic, CT (US); Adam P. Generale, Dobbs Ferry, NY (US); Xuan Liu, Glastonbury, CT (US); Mark F. Zelesky, Bolton, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 655 days.

(21) Appl. No.: 16/549,187

(22) Filed: Aug. 23, 2019

(65) Prior Publication Data

US 2021/0054749 A1 Feb. 25, 2021

(51) Int. Cl.
*F01D 5/28* (2006.01)

(52) U.S. Cl.
CPC ............. *F01D 5/288* (2013.01); *F01D 5/284* (2013.01); *F05D 2220/32* (2013.01); *F05D 2240/305* (2013.01); *F05D 2240/306* (2013.01); *F05D 2300/15* (2013.01); *F05D 2300/21* (2013.01); *F05D 2300/222* (2013.01); *F05D 2300/30* (2013.01); *F05D 2300/6033* (2013.01); *F05D 2300/611* (2013.01); *F05D 2300/6111* (2013.01)

(58) Field of Classification Search
CPC ...... F01D 5/288; F01D 5/284; F05D 2220/32; F05D 2240/305; F05D 2240/306
See application file for complete search history.

(56) References Cited

U.S. PATENT DOCUMENTS

| | | | | |
|---|---|---|---|---|
| 7,348,287 | B2 * | 3/2008 | Mechnich | C04B 41/009 427/421.1 |
| 7,951,459 | B2 * | 5/2011 | Tang | C23C 24/10 416/241 B |
| 2013/0189531 | A1 | 7/2013 | Lee | |
| 2013/0344319 | A1 * | 12/2013 | Zhu | C04B 41/5044 428/335 |
| 2014/0220324 | A1 * | 8/2014 | Strock | C23C 28/36 427/446 |
| 2015/0369053 | A1 * | 12/2015 | Bunker | C23C 24/04 427/259 |

(Continued)

OTHER PUBLICATIONS

European Search Report for European Patent Application No. 20191823.2 completed Jan. 15, 2021.

*Primary Examiner* — Juan G Flores
*Assistant Examiner* — Brian Christopher Delrue
(74) *Attorney, Agent, or Firm* — Carlson, Gaskey & Olds, P.C.

(57) ABSTRACT

An airfoil includes an airfoil wall that defines a leading end, a trailing end, and suction and pressure sides that join the leading end and the trailing end. The airfoil wall is formed of a silicon-containing ceramic. A first environmental barrier topcoat is disposed on the suction side of the airfoil wall, and a second, different environmental barrier topcoat is disposed on the pressure side of the airfoil wall. The first topcoat is vaporization-resistant and the second topcoat is resistant to calcium-magnesium-aluminosilicate.

6 Claims, 5 Drawing Sheets

(56) References Cited

U.S. PATENT DOCUMENTS

| | | | |
|---|---|---|---|
| 2016/0047253 A1* | 2/2016 | Ward, Jr. | F01D 5/288 |
| | | | 427/256 |
| 2016/0153288 A1 | 6/2016 | Luthra | |
| 2016/0305319 A1* | 10/2016 | Baldiga | C04B 41/85 |
| 2018/0363478 A1* | 12/2018 | Margolies | F01D 25/24 |
| 2019/0119803 A1* | 4/2019 | Tang | F01D 5/282 |
| 2020/0024977 A1* | 1/2020 | Shi | F01D 5/288 |
| 2021/0054749 A1* | 2/2021 | Jackson | C04B 41/52 |
| 2021/0246081 A1* | 8/2021 | Thomas | F01D 5/284 |

* cited by examiner

AIRFOIL HAVING ENVIRONMENTAL BARRIER TOPCOATS THAT VARY IN COMPOSITION BY LOCATION

BACKGROUND

Components in a gas turbine engine often include barrier coatings to protect the underlying component from the effects of the severe operating environment. Barrier coatings are available in numerous varieties, which can include thermal barrier coatings and environmental barrier coatings. Thermal barrier coatings are typically designed for maximizing thermal insulation of a component from the surrounding high-temperature environment. Environmental barrier coatings are typically designed for maximizing resistance of infiltration or attack by the environment.

SUMMARY

An airfoil according to an example of the present disclosure includes an airfoil wall that defines a leading end, a trailing end, and suction and pressure sides that join the leading end and the trailing end. The airfoil wall is formed of a silicon-containing ceramic. A first environmental barrier topcoat is disposed on the suction side of the airfoil wall. A second, different environmental barrier topcoat is disposed on the pressure side of the airfoil wall.

In a further embodiment of any of the foregoing embodiments, the first environmental barrier topcoat is of a composition that is selected from $HfO_2$, rare earth monosilicate, $HfSiO_4$, $Y_2Si_2O_7$, $Yb_2Si_2O_7$, alkaline earth alumino-silicates, and combinations thereof.

In a further embodiment of any of the foregoing embodiments, the second environmental barrier topcoat is of a composition that is selected from a mixture of $HfSiO_4$ and calcium aluminosilicate, $Ca_2Y_8(SiO_4)_6O_2$, $Gd_2Hf_2O_7$, a mixture of $HfO_2$, $HfSiO_4$ and calcium aluminosilicate, $Y_2Si_2O_7$, $Yb_2Si_2O_7$, $Gd_2Si_2O_7$, and combinations thereof.

In a further embodiment of any of the foregoing embodiments, the first environmental barrier topcoat is of a composition that is selected from $HfO_2$, rare earth monosilicate, $HfSiO_4$, $Y_2Si_2O_7$, $Yb_2Si_2O_7$, alkaline earth alumino-silicates, and combinations thereof, and the second environmental barrier topcoat is of a composition that is selected from a mixture of $HfSiO_4$ and calcium aluminosilicate, $Ca_2Y_8(SiO_4)_6O_2$, $Gd_2Hf_2O_7$, a mixture of $HfO_2$, $HfSiO_4$ and calcium aluminosilicate, $Y_2Si_2O_7$, $Yb_2Si_2O_7$, $Gd_2Si_2O_7$, and combinations thereof.

In a further embodiment of any of the foregoing embodiments, the first environmental barrier topcoat is multi-layered and includes an over-layer of a composition that is selected from $HfO_2$, $Y_2SiO_5$, $YbSiO_5$, and combinations thereof and an under-layer of a composition that is selected from $HfSiO_4$, $Y_2Si_2O_7$, $Yb_2Si_2O_7$, and combinations thereof.

In a further embodiment of any of the foregoing embodiments, the second environmental barrier topcoat is multi-layered and includes an over-layer selected from a mixture of $HfSiO_4$ and calcium aluminosilicate, $Ca_2Y_8(SiO_4)_6O_2$, $Gd_2Hf_2O_7$, a mixture of $HfO_2$, $HfSiO_4$ and calcium aluminosilicate, $Y_2Si_2O_7$, $Yb_2Si_2O_7$, $Gd_2Si_2O_7$, and combinations thereof and an under-layer of a composition of a mixture of $HfSiO_4$ and calcium aluminosilicate.

In a further embodiment of any of the foregoing embodiments, the first environmental barrier topcoat is multi-layered and includes an over-layer of a composition that is selected from $HfO_2$, $Y_2SiO_5$, $YbSiO_5$, and combinations thereof and an under-layer of a composition that is selected from $HfSiO_4$, $Y_2Si_2O_7$, $Yb_2Si_2O_7$, and combinations thereof, and the second environmental barrier topcoat is multi-layered and includes an over-layer of a composition of $Gd_2Hf_2O_7$ and an under-layer of a composition of a mixture of $HfSiO_4$ and calcium aluminosilicate.

A further embodiment of any of the foregoing embodiments includes a third environmental barrier topcoat disposed on the leading end of the airfoil wall.

In a further embodiment of any of the foregoing embodiments, the third environmental barrier topcoat is of a composition selected from yttria stabilized zirconia, $ZrO_2$-$YO_{1.5}TaO_{2.5}$ and combinations thereof.

In a further embodiment of any of the foregoing embodiments, the first environmental barrier topcoat is of a composition that is selected from $HfO_2$, rare earth monosilicate, $HfSiO_4$, $Y_2Si_2O_7$, $Yb_2Si_2O_7$, alkaline earth alumino-silicates ($AEAl_2Si_2O_8$), and combinations thereof, and the second environmental barrier topcoat is of a composition that is selected from a mixture of $HfSiO_4$ and calcium aluminosilicate, $Ca_2Y_8(SiO_4)_6O_2$, $Gd_2Hf_2O_7$, a mixture of $HfO_2$, $HfSiO_4$ and calcium aluminosilicate, $Y_2Si_2O_7$, $Yb_2Si_2O_7$, $Gd_2Si_2O_7$, and combinations thereof.

In a further embodiment of any of the foregoing embodiments, the first environmental barrier topcoat is multi-layered and includes an over-layer of a composition that is selected from $HfO_2$, $Y_2SiO_5$, $YbSiO_5$, and combinations thereof and an under-layer of a composition that is selected from $HfSiO_4$, $Y_2Si_2O_7$, $Yb_2Si_2O_7$, and combinations thereof, and the second environmental barrier topcoat is multi-layered and includes an over-layer of a composition of $Gd_2Hf_2O_7$ and an under-layer of a composition of a mixture of $HfSiO_4$ and calcium aluminosilicate.

A further embodiment of any of the foregoing embodiments includes a fourth environmental barrier topcoat disposed in the trailing end of the airfoil wall, wherein the fourth environmental barrier topcoat is thicker than each of the first environmental barrier topcoat and the second environmental barrier topcoat.

A further embodiment of any of the foregoing embodiments includes a fourth environmental barrier topcoat disposed in the trailing end of the airfoil wall, wherein the fourth environmental barrier topcoat has, by volume percent, a higher porosity than each of the first environmental barrier topcoat and the second environmental barrier topcoat.

An airfoil according to an example of the present disclosure includes an airfoil wall that defines a leading end including an apex, a trailing end, and suction and pressure sides that join the leading end and the trailing end. The airfoil wall is formed of a silicon-containing ceramic. A vaporization-resistant environmental barrier topcoat of a first composition is disposed on the suction side of the airfoil wall. The vaporization-resistant environmental barrier topcoat initiates at the leading end at a first distance from the apex. A calcium-magnesium-aluminosilicate-resistant environmental barrier topcoat of a second, different composition is disposed on the pressure side of the airfoil wall. The calcium-magnesium-aluminosilicate-resistant environmental barrier topcoat initiates at the leading end at a second distance from the apex In a further embodiment of any of the foregoing embodiments, the first distance is from 0.5 millimeters to 7.7 millimeters and the second distance is from 0.5 millimeters to 7.7 millimeters.

In a further embodiment of any of the foregoing embodiments, the first distance is from 1.2 millimeters to 3 millimeters and the second distance is from 1.2 millimeters to 3 millimeters.

In a further embodiment of any of the foregoing embodiments, the vaporization-resistant environmental barrier topcoat is of a composition that is selected from $HfO_2$, rare earth monosilicate, $HfSiO_4$, $Y_2Si_2O_7$, $Yb_2Si_2O_7$, alkaline earth alumino-silicates ($AEAl_2Si_2O_8$), and combinations thereof, and the calcium-magnesium-aluminosilicate-resistant environmental barrier topcoat is of a composition that is selected from a mixture of $HfSiO_4$ and calcium aluminosilicate, $Ca_2Y_8(SiO_4)_6O_2$, $Gd_2Hf_2O_7$, a mixture of $HfO_2$, $HfSiO_4$ and calcium aluminosilicate, $Y_2Si_2O_7$, $Yb_2Si_2O_7$, $Gd_2Si_2O_7$, and combinations thereof.

In a further embodiment of any of the foregoing embodiments, the vaporization-resistant environmental barrier topcoat is multi-layered and includes an over-layer of a composition that is selected from $HfO_2$, $Y_2SiO_5$, $YbSiO_5$, and combinations thereof and an under-layer of a composition that is selected from $HfSiO_4$, $Y_2Si_2O_7$, $Yb_2Si_2O_7$, and combinations thereof, and the calcium-magnesium-aluminosilicate-resistant environmental barrier topcoat is multi-layered and includes an over-layer of a composition of $Gd_2Hf_2O_7$ and an under-layer of a composition of $HfSiO_4$ and calcium aluminosilicate.

A further embodiment of any of the foregoing embodiments includes an additional environmental barrier topcoat disposed on the trailing end of the airfoil wall, the additional environmental barrier coating initiating at a distance from a mechanical trailing edge of the airfoil that is greater than the thickness of the mechanical trailing edge by a factor of 2 to 10.

A gas turbine engine according to an example of the present disclosure includes a compressor section, a combustor in fluid communication with the compressor section, and a turbine section in fluid communication with the combustor. The turbine section has an airfoil according to the foregoing embodiments.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
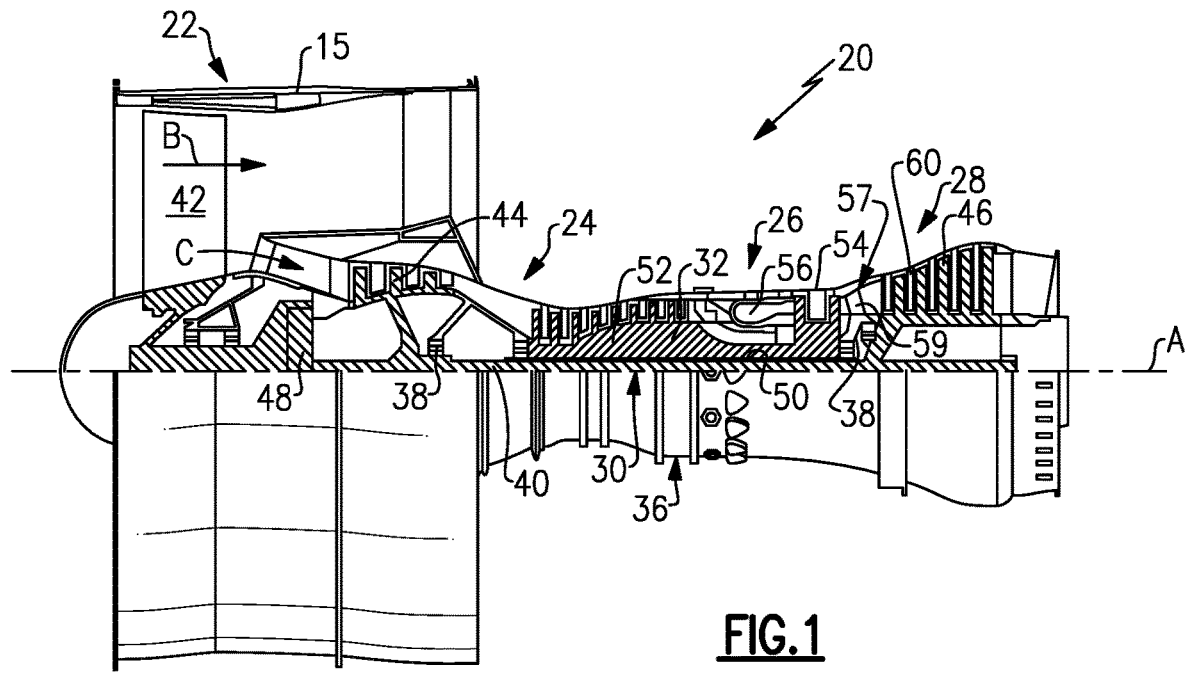
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

Figure 2:
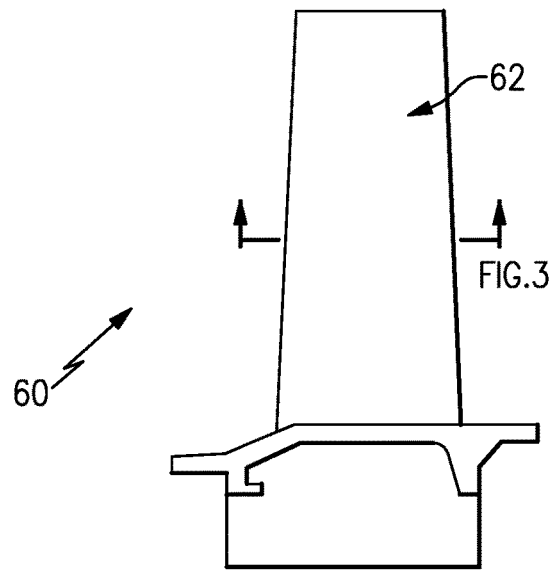
FIG. 2 illustrates an example airfoil of the gas turbine engine.
Figure 3:
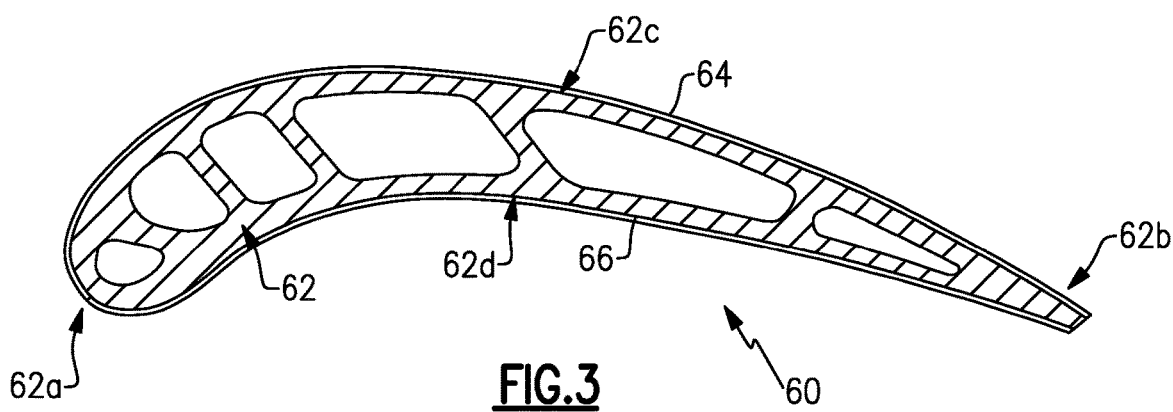
FIG. 3 illustrates a sectioned view of an airfoil that has first and second environmental barrier topcoats.

FIG. 2 illustrates a representative example of an airfoil 60 used in the turbine engine 20 (see also FIG. 1), and FIG. 3 illustrates a sectioned view of the airfoil 60. As shown, the airfoil 60 is a turbine blade; however, it is to be understood that, although the examples herein may be described and shown with reference to turbine blades, this disclosure is also applicable to turbine vanes as well as cooled blades or vanes in locations other than shown.

The airfoil 60 includes an (outer) airfoil wall 62 that delimits the aerodynamic profile of the airfoil 60. In this regard, the wall 62 defines a leading end 62a (see FIG. 3), a trailing end 62b, and first and second sides 62c/62d that join the leading end 62a and the trailing end 62b. In this example, the first side 62c is a suction side and the second side 62d is a pressure side. The airfoil wall 62 generally extends in a longitudinal direction, which in the engine 20 is an axial direction relative to the central engine axis A. For a blade, the airfoil wall 62 will typically span from an inner platform to a free tip end. In a vane, the airfoil wall 62 will typically span from an inner platform to an outer platform.

The airfoil wall 62 is formed of a ceramic material and, in particular, a silicon-containing ceramic. An example silicon-containing ceramic is silicon carbide (SiC). In a further example, the airfoil wall 62 is formed of a SiC/SiC ceramic matrix composite in which SiC fibers are disposed within a SiC matrix.

An airfoil may be exposed to relatively severe environmental conditions during operation. Such conditions can reduce the durability of silicon-containing ceramics, such as silicon carbide. In this regard, silicon-containing ceramic airfoils can include an environmental barrier coating ("EBC") that is designed to protect the underlying ceramic from the conditions and, in particular, resist infiltration or attack by environmental substances. The local conditions across an airfoil can, however, significantly vary and thus challenge an EBC that is designed for best performance in average or typical conditions. In particular, conditions can vary between the suction and pressure sides with regard to volatilization conditions and calcium-magnesium-aluminosilicate ("CMAS") exposure. Volatilization occurs when silicon in an EBC reacts and is converted to a gaseous product that results in material loss and reduction in structural integrity. Dirt/debris that deposits on an airfoil surface can be molten at times, and this viscous liquid can react with and wick into an EBC and ultimately cause spallation. The airfoil leading edge and outboard ~75-100% span, forward suction side may also be exposed to more severe conditions of foreign and bill of material object impact, and erosion than the remainder of the airfoil, and temperature conditions may be highest at the trailing end. In these regards, as will be described in more detail below, the airfoil 60 includes EBCs that selectively vary in composition by location over the airfoil 60 in order to enhance local environmental protection of the airfoil 60.

The example in FIG. 3 relates to the varying conditions between the suction side 62c and the pressure side 62d with regard to volatilization conditions and CMAS exposure. For instance, volatilization conditions are more severe at the suction side 62c due to the higher local gas velocities at the suction side 62c in comparison to the pressure side 62d. And CMAS exposure is more severe at the pressure side 62d due to contact with dirt/debris that impact the pressure side 62d. In these regards, the airfoil 60 includes a first or vaporization-resistant environmental barrier topcoat 64 (hereafter "first topcoat 64") that is disposed on the suction side 62c and a second or CMAS-resistant environmental barrier topcoat 66 (hereafter "second topcoat" 66") disposed on the pressure side 62d that is of different composition than the topcoat 64. It is to be appreciated that as used herein the term "topcoat" refers to an external coating that is directly exposed to the surrounding environment of the airfoil 60. Such a topcoat may be a single layer or multilayer structure, and may be directly disposed on the underlying airfoil wall 62 (with no over-layers) or overlie one or more coating under-layers.

In examples, the first topcoat 64 is of a composition that is selected from $HfO_2$, rare earth monosilicate ($RESiO_5$), $HfSiO_4$, $Y_2Si_2O_7$, $Yb_2Si_2O_7$, alkaline earth alumino-silicates ($AEAl_2Si_2O_8$) and combinations thereof. Rare earth elements include cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y). In additional examples, the rare earth silicate is $Y_2SiO_5$, $YbSiO_5$, or a combination thereof. Alkaline earth elements include magnesium (Mg), calcium (Ca), strontium (Sr), barium (Ba), and radium (Ra). An example of an alkaline earth alumino silicate is $Ba_{0.75}Sr_{0.25}Al_2Si_2O_8$ (BSAS). In additional examples, the first topcoat 64 is of a composition that is selected from $HfO_2$, $Y_2SiO_5$, $YbSiO_5$, or combinations thereof. The $HfO_2$, excludes silicon, and silicon volatilization is thus avoided. The $Y_2SiO_5$ and $YbSiO_5$ include silicon but the silicon in these compounds has a low vapor pressure. The $HfSiO_4$, $Y_2Si_2O_7$, and $Yb_2Si_2O_7$ may also be used. The silicon in $Y_2SiO_5$ and $YbSiO_5$ has a higher silicon vapor pressure but the activity of the silicon is relatively low in comparison to pure $SiO_2$.

The second topcoat 66 is of a composition that is selected from a mixture of $HfSiO_4$ and calcium aluminosilicate, $Ca_2Y_8(SiO_4)_6O_2$, $Gd_2Hf_2O_7$, a mixture of $HfO_2$, $HfSiO_4$ and calcium aluminosilicate, $Y_2Si_2O_7$, $Yb_2Si_2O_7$, $Gd_2Si_2O_7$, and combinations thereof. The first topcoat 64 is generally formulated to either exclude silicon, in which case silicon volatilization is avoided, or include silicon in a low vapor pressure compound. Such a low vapor pressure compound reduces the propensity of the silicon to volatilize in the low pressure conditions at the suction side 62c. In general, the vapor pressure of the silicon (if present) in the first topcoat 64 is at least 10% lower than the vapor pressure of the silicon (if present) in the second topcoat 66. The second topcoat 66, on the other hand, is formulated for higher density than the first topcoat 64 and/or for chemical compatibility with CMAS in order to block or hinder infiltration of the CMAS.

Figure 4:
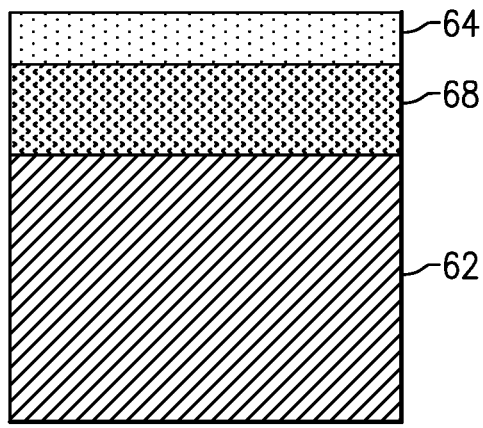
FIG. 4 illustrates a sectioned view of the first environmental barrier topcoat.

FIG. 4 illustrates a representative sectioned view of a further example of the first topcoat 64. In this example, a bondcoat 68 is disposed between the first topcoat 64 and the airfoil wall 62 (i.e., substrate). For example, the bondcoat 68 facilitates adherence of the first topcoat 64 to the airfoil wall 62 and/or provides additional environmental protection. The bondcoat 68 may be a single layer or multi-layered. As an example, the bondcoat 68 may include silicon (elemental), metal silicides (e.g., $MoSi_2$ $Nb_5Si_3$ and $YSi_2$), and composite bond coats in which oxygen getter phases are disposed in a glass and/or ceramic matrix.

Figure 5:
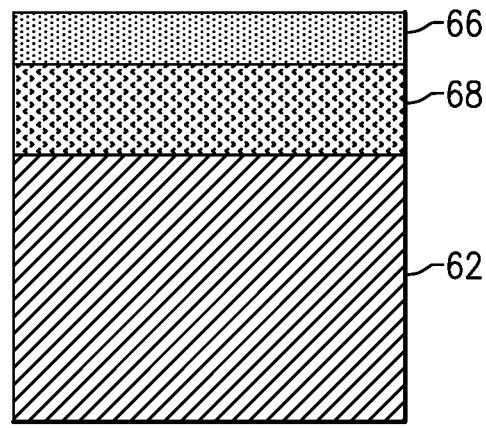
FIG. 5 illustrates a sectioned view of the second environmental barrier topcoat.

Likewise, FIG. 5 illustrates a representative sectioned view of a further example of the second topcoat 66. In this example, the bondcoat 68 is also disposed between the second topcoat 66 and the airfoil wall 62 (i.e., substrate). The bondcoat 68 may be a single layer or multi-layered and may be of the compositions described above.

Figure 6:
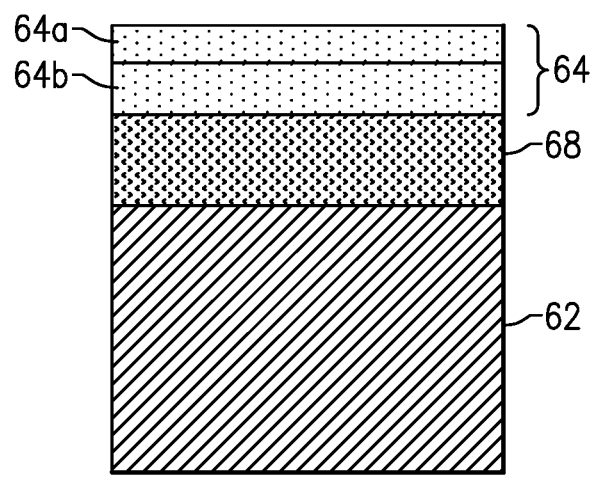
FIG. 6 illustrates a sectioned view of a multi-layered first environmental barrier topcoat.

In further examples, the first topcoat 64, the second topcoat 66, or both may be multi-layered. For example, FIG. 6 illustrates a multi-layered structure of the first topcoat 64, including an over-layer 64a and an under-layer 64b. The over-layer 64a is of a composition that is selected from $HfO_2$, $Y_2SiO_5$, $YbSiO_5$, and combinations thereof, and the under-layer 64b is of a composition that is selected from $HfSiO_4$, $Y_2Si_2O_7$, $Yb_2Si_2O_7$, and combinations thereof. In general the over-layer 64b provides enhanced resistance to volatilization. The under-layer 64b may have a lower resistance to volatilization but better resistance to CMAS. In an additional example, the thermal expansion coefficient of the $HfSiO_4$, $Y_2Si_2O_7$, and/or $Yb_2Si_2O_7$ of under-layer 64b closely matches the SiC of the airfoil wall 62 than the materials of the over-layer 64a. Thus, in circumstances where it is desired to increase the total thickness of the first topcoat 64, the mechanical stability can be increased by increasing the thickness of the under-layer 64b with respect to the over-layer 64a. In one variation, the first topcoat 64 is multi-layered and includes the second topcoat 66 as an under-layer. That is, the under-layer 64b may be any of the compositions disclosed herein for the second topcoat 66 and the over-layer 64a may be any of the compositions disclosed herein for the topcoat 64. Such a configuration may be fabricated by apply the second topcoat 66 to the entire airfoil 60, and then applying the first topcoat 64 on the suction side of the airfoil 60 such that the topcoat 66 on the suction side becomes the under-layer 64b and the topcoat 64 becomes the over-layer 64a.

Figure 7:
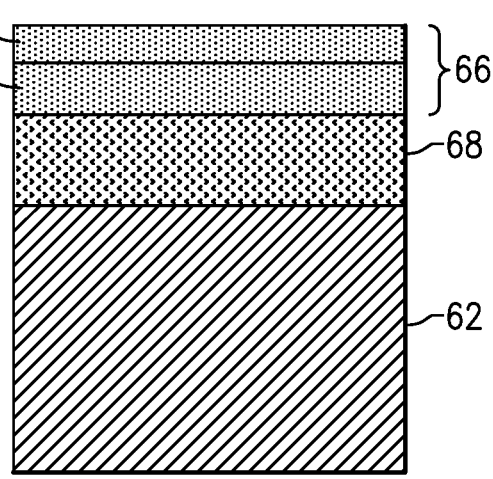
FIG. 7 illustrates a sectioned view of a multi-layered second environmental barrier topcoat.

FIG. 7 illustrates a multi-layered structure of the second topcoat 66, including an over-layer 66a and an under-layer 66b. The over-layer 66a may be a composition as disclosed above for the second topcoat 66, such as a composition of $Gd_2Hf_2O_7$, and the under-layer 66b is of a composition of $HfSiO_4$ and calcium aluminosilicate or $HfSiO_4$ or $Yb_2Si_2O_7$ or $Y_2Si_2O_7$. For instance, the calcium aluminosilicate is in discrete regions that are dispersed in the $HfSiO_4$ matrix. The over-layer 66a and the under-layer 66b may serve to provide different levels of CMAS resistance.

Figure 8:
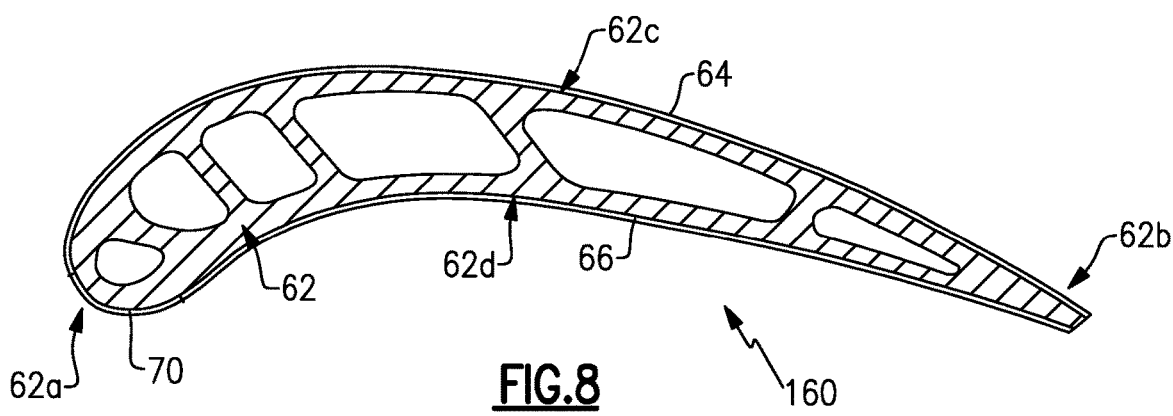
FIG. 8 illustrates a sectioned view of another example airfoil that additionally has a third environmental barrier topcoat.

FIG. 8 illustrates a further example of an airfoil 160 that may be used in the engine 20. In this disclosure, like reference numerals designate like elements where appropriate and reference numerals with the addition of one-hundred or multiples thereof designate modified elements that are understood to incorporate the same features and benefits of the corresponding elements. The airfoil 160 is similar to the airfoil 60 but additionally includes a third environmental barrier topcoat 70 ("third topcoat 70") that is disposed on the leading edge and outboard forward suction side 62c of the airfoil wall 62. For instance, the third topcoat 70 has a composition that is configured to enhance resistance to impact and erosion. For example, the third topcoat 70 is of a composition selected from yttria stabilized zirconia, $(1-2x)ZrO_2$, $xYO_{1.5}$, $xTaO_{2.5}$, and combinations thereof. In one example, the yttria stabilized zirconia is stabilized with, by weight percent, approximately 7% of the yttria (i.e. 7YSZ). In one example, the $(1-2x)ZrO_2$, $xYO_{1.5}$, $xTaO_{2.5}$, contains, by atomic ratio, "x" ranging from 5 to 25%

Figure 9:
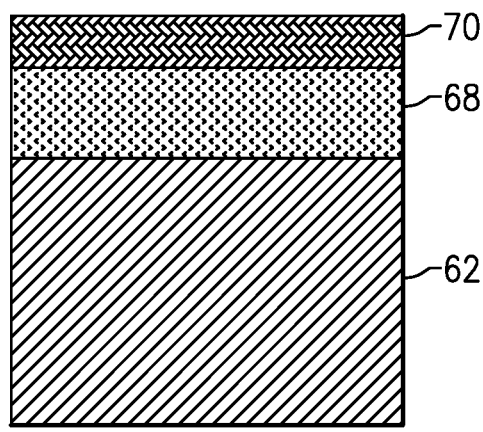
FIG. 9 illustrates a sectioned view of the third environmental barrier topcoat.

FIG. 9 illustrates a representative sectioned view of a further example of the third topcoat 70. In this example, the bondcoat 68 is also disposed between the third topcoat 70 and the airfoil wall 62 (i.e., substrate). The bondcoat 68 may be a single layer or multi-layered and may be of the compositions described above.

Figure 10:
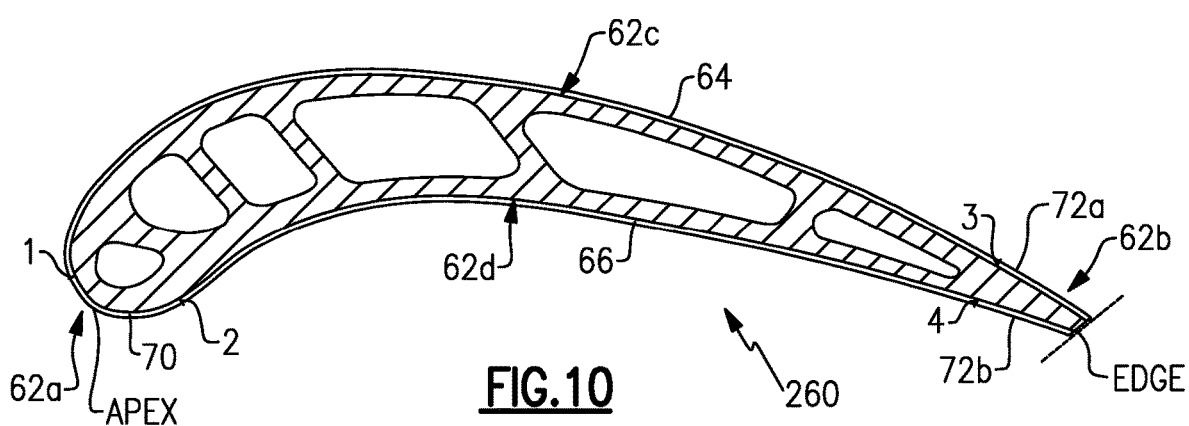
FIG. 10 illustrates a sectioned view of another example airfoil that additionally includes a fourth environmental barrier topcoat.

FIG. 10 illustrates a further example of an airfoil 260 that may be used in the engine 20. The airfoil 260 is similar to the airfoil 160 but additionally includes a fourth environmental barrier topcoat 72a/72b that is disposed on the trailing end 62b of the airfoil wall 62. For instance, the fourth topcoat 72a/72b is configured to enhance thermal resistance at the trailing end 62b. In this regard, the fourth topcoat 72a is thicker than each of the first topcoat 64 and the second topcoat 66 in order to provide enhanced thermal barrier. Additionally or alternatively, the fourth topcoat 72a/72b may have, by volume percent, a higher porosity than each of the first topcoat 64 and the second topcoat 66.

Figure 11:
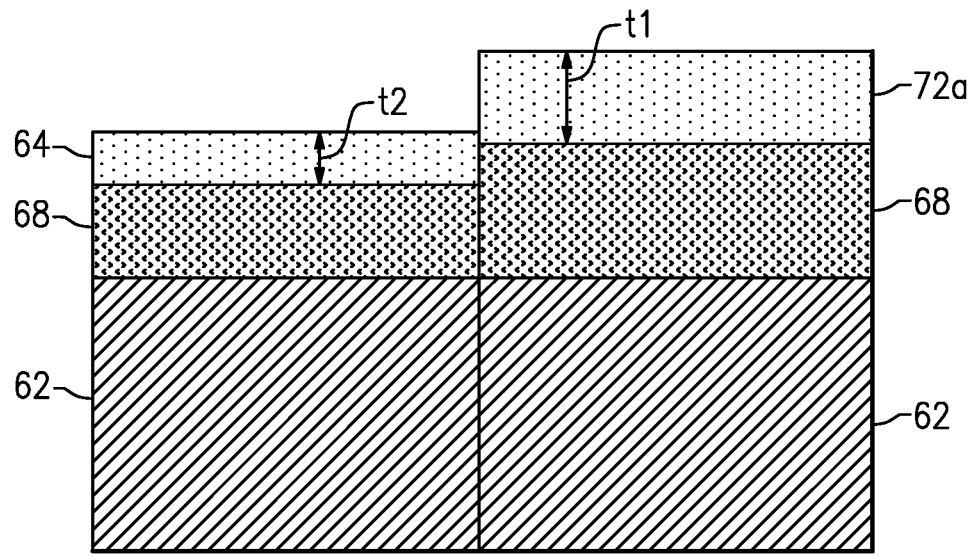
FIG. 11 illustrates a sectioned view through a portion of the fourth environmental barrier topcoat.

As an example, FIG. 11 shows the fourth topcoat 72a adjacent the first topcoat 64. In this example, the fourth topcoat 72a is of the same composition as the first topcoat 64 and also includes the bondcoat 68. The fourth topcoat 72a has a thickness t1 and the first topcoat 64 has a thickness t2. The thickness t1 is from 110% to 500% of t2. Similarly, the bondcoat 68 underlying the fourth topcoat 72a may be thicker than the bondcoat 68 underlying the first topcoat 64. The fourth topcoat 72a may also be segmented or have other features for stress cracking relief.

Figure 12:
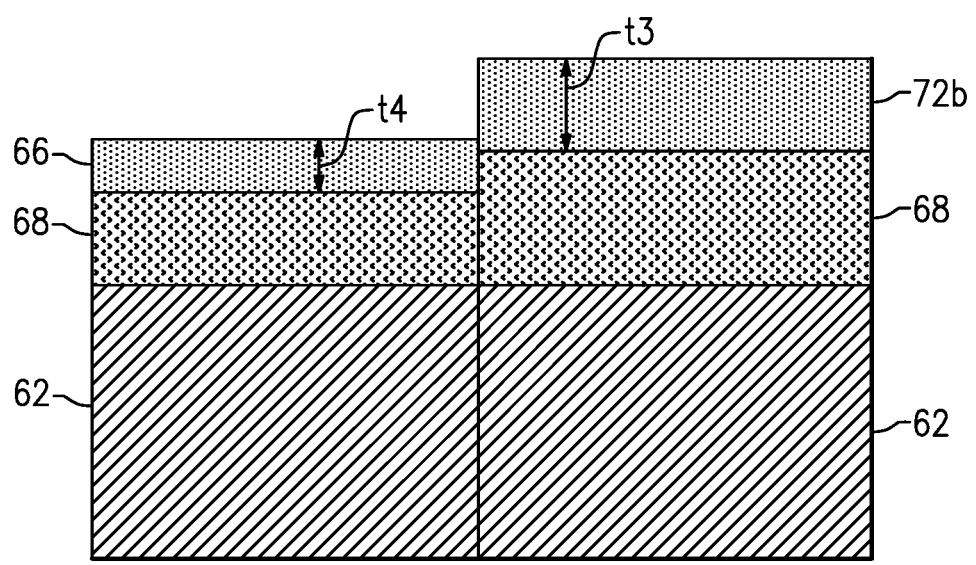
FIG. 12 illustrates a sectioned view through another portion of the fourth environmental barrier topcoat.

The example in FIG. 12 shows the fourth topcoat 72b adjacent the second topcoat 66. In this example, the fourth topcoat 72b is of the same composition as the second topcoat 66 and also includes the bondcoat 68. The fourth topcoat 72b has a thickness t3 and the second topcoat 66 has a thickness t4. The thickness t3 is from 110% to 500% of t4. Similarly, the bondcoat 68 underlying the fourth topcoat 72b may be thicker than the bondcoat 68 underlying the second topcoat 66. The fourth topcoat 72b may also be segmented or have other features for stress cracking relief.

Alternatively or additionally, the fourth topcoat 72a/72b may have a higher porosity, by volume percent, than each of the first topcoat 64 and the second topcoat 66. The higher porosity serves to increase the thermal insulating effect of the fourth topcoat 72a/72b to provide enhanced thermal resistance at the trailing end 62b. For example, the porosity of the fourth topcoat 72a/72b is higher than the porosity of each of the first topcoat 64 and the second topcoat 66 by a factor of 1.1 to 5. As an example, the first topcoat 64 may have a porosity of 0.5-20%, and especially from 1-5%. The fourth topcoat 72a/2b may have a porosity of 1-50%, and especially 5-15%.

In further examples, the particular locations of the topcoats 64/66/70/72a/72b on the airfoil wall 62 are controlled to correspond to the local variations in the environmental conditions. For instance, the locations may be represented by transition points (or ranges) at which the conditions change. Such transition points or ranges may be relative to one or more reference locations or reference conditions. Referring to FIG. 10, the first topcoat 64 initiates at point 1 and terminates at point 3; the second topcoat initiates at point 2 and terminates at point 4; the third topcoat 70 initiates at point 1 and terminates at point 2; and the fourth topcoats 72a and 72b initiate at, respectively, points 3 and 4. For instance, point 1 represents the location where the leading end 62a transitions to the suction side 62c, point 2 represents the location where the leading end 62a transitions into the pressure side 62d (and this region from point 1 to point 2 is defined by curvature values in excess of 1.5), point 3 represents the location where the suction side 62c transitions into the trailing end 62b, and point 4 represents the location where the pressure side 62d transitions into the trailing end 62d. Points 1 and 2 may be located relative to the apex of the leading end 62a, which may be the stagnation point of the airfoil. The stagnation point is the location at which the local flow velocity is zero. In examples, points 1 and 2 are both located from 0.5 millimeters to 7.7 millimeters along the surface of the airfoil from the apex, such as from 1.2 millimeters to 3.5 millimeters. Points 3 and 4 may be located with reference to a distance from the mechanical trailing edge. For example, the distance is relative to a thickness at the mechanical trailing edge (without coatings). In one example, the distance is greater than the thickness by a factor of 2 to 10. At each of the points 1, 2, 3, and 4 the respective topcoats may discretely abut, overlap, or transition in a graded manner.

As shown, point 1 is toward the suction side of the airfoil 260 and point 2 is toward the pressure side of the airfoil 260. In variations, point 1, point 2, or both may be inverted. For instance, an inverted point 1 is located from 0.5 millimeters to 7.7 millimeters along the surface of the airfoil from the apex toward the pressure side, and an inverted point 2 is located from 0.5 millimeters to 7.7 millimeters along the surface of the airfoil from the apex toward the suction side. As a result of the inversion, the associated coating in essence "wraps around" the leading end 62a. If both points 1 and 2 are inverted, the associated coatings would overlap over the leading end 62a.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
   an airfoil wall defining a leading end, a trailing end, and suction and pressure sides joining the leading end and the trailing end, the airfoil wall being formed of a silicon-containing ceramic;
   a first environmental barrier topcoat of a first composition disposed on the suction side of the airfoil wall;
   a second environmental barrier topcoat of a second, different composition disposed on the pressure side of the airfoil wall; and
   wherein the second environmental barrier topcoat is multi-layered and includes an over-layer selected from a mixture of HfSiO4 and calcium aluminosilicate, Ca2Y8(SiO4)6O2, Gd2Hf2O7, a mixture of HfO2, HfSiO4 and calcium aluminosilicate, Y2Si2O7, Yb2Si2O7, Gd2Si2O7, and combinations thereof and an under-layer of a composition of a mixture of HfSiO4 and calcium aluminosilicate.

2. The airfoil as recited in claim 1, wherein the first environmental barrier topcoat is multi-layered and includes an over-layer of a composition that is selected from $HfO_2$, $Y_2SiO_5$, $YbSiO_5$, and combinations thereof and an under-layer of a composition that is selected from $HfSiO_4$, $Y_2Si_2O_7$, $Yb_2Si_2O_7$, and combinations thereof.

3. The airfoil as recited in claim 1, wherein the first environmental barrier topcoat is multi-layered and includes an over-layer of a composition that is selected from HfO2, Y2SiO5, YbSiO5, and combinations thereof and an under-layer of a composition that is selected from HfSiO4, Y2Si2O7, Yb2Si2O7, and combinations thereof, and the second environmental barrier topcoat is multi-layered and includes an over-layer of a composition of Gd2Hf2O7.

4. The airfoil as recited in claim 3, further comprising a third environmental barrier topcoat disposed on the leading end of the airfoil wall.

5. The airfoil as recited in claim 4, wherein the third environmental barrier topcoat is of a composition selected from yttria stabilized zirconia, $ZrO_2YO_{1.5}TaO_{2.5}$, and combinations thereof.

6. A gas turbine engine comprising:
   a compressor section;
   a combustor in fluid communication with the compressor section; and
   a turbine section in fluid communication with the combustor, the turbine section having an airfoil that includes an airfoil wall defining a leading end, a trailing end, and suction and pressure sides joining the leading end and the trailing end, the airfoil wall being formed of a silicon-containing ceramic, a first environmental barrier topcoat of a first composition disposed on the suction side of the airfoil wall, and
   a second environmental barrier topcoat of a second, different composition disposed on the pressure side of the airfoil wall; and
   wherein the second environmental barrier topcoat is multi-layered and includes an over-layer selected from a mixture of HfSiO4 and calcium aluminosilicate, $Ca_2Y_8(SiO_4)_6O_2$, $Gd_2Hf_2O_7$, a mixture of $HfO_2$, $HfSiO_4$ and calcium aluminosilicate, $Y_2Si_2O_7$, $Yb_2Si_2O_7$, $Gd_2Si_2O_7$, and combinations thereof and an under-layer of a composition of a mixture of $HfSiO_4$ and calcium aluminosilicate.

* * * * *